United States Patent [19]

Sawada et al.

[11] Patent Number: 4,714,368
[45] Date of Patent: Dec. 22, 1987

[54] BUSH WITH A SPHERICAL SLIDING SURFACE

[75] Inventors: Kouji Sawada, Toyota; Kiyokatsu Miura, Gamagoori; Keiichiro Suzuki, Shizuoka; Hidetaka Idosako; Hideo Kazusa, both of Hamamatsu, all of Japan

[73] Assignees: Toyota Jidosha Kabushiki Kaisha; Ishikawa Tekko Kabushiki Kaisha, both of Japan

[21] Appl. No.: 917,961

[22] Filed: Oct. 14, 1986

[30] Foreign Application Priority Data

Oct. 11, 1985 [JP] Japan .............. 60-154413[U]

[51] Int. Cl.⁴ .............................. F16C 11/06
[52] U.S. Cl. .................... 403/132; 403/133; 403/140
[58] Field of Search .......... 403/132, 135, 138, 140, 403/133, 122, 134, 136, 144, 139

[56] References Cited

U.S. PATENT DOCUMENTS

| | | | |
|---|---|---|---|
| 3,099,879 | 8/1963 | Horovitz | 403/140 |
| 3,362,735 | 1/1968 | Maxeimer | 403/132 |
| 3,411,803 | 11/1968 | Melton et al. | 403/119 |
| 4,003,666 | 1/1977 | Gaines et al. | 403/134 X |
| 4,034,996 | 7/1977 | Manita et al. | 403/140 |
| 4,076,344 | 2/1978 | Gaines et al. | 403/140 |
| 4,386,869 | 6/1983 | Smith | 403/134 X |
| 4,577,989 | 3/1986 | Ito | 403/135 |

FOREIGN PATENT DOCUMENTS

| | | | |
|---|---|---|---|
| 55-179222 | 6/1980 | Japan . | |
| 55-90713 | 7/1980 | Japan | 403/132 |
| 58-172137 | 11/1983 | Japan . | |
| 2038928 | 7/1980 | United Kingdom | 403/140 |

OTHER PUBLICATIONS

ATZ, dated Jul./Aug. 1982.

Primary Examiner—Andrew V. Kundrat
Assistant Examiner—Peter M. Cuomo
Attorney, Agent, or Firm—Parkhurst & Oliff

[57] ABSTRACT

A bush with a sliding surface comprising a socket, a ball-integral shaft having shaft portions on both sides of a ball portion, a bearing body location between the socket and the ball-integral shaft, and a cushion having recesses in at least one axial end portions thereof constructed of polyurethane resins or polyester resins. Excellent absorption of manufacturing tolerances of parts of the bush and easy adjustment of rotational torque of the bush in normal operating conditions are obtained through use of the bush of the present invention. Additionally, the bush can show excellent load bearing characteristics even when the bush receives large loads beyond normal operating loads. Further, the durability of the bush is improved.

11 Claims, 9 Drawing Figures

BUSH WITH A SPHERICAL SLIDING SURFACE

BACKGROUND OF THE INVENTION

The present invention relates to a bush with a spherical sliding surface including a socket and a ball-integral shaft with shaft portions on both sides of a ball portion, which is suitable, but not exclusively, for use in suspension systems of automobiles.

As a bush for use in a rear suspension of an automobile, for example, as a bush for use in a connecting portion of a torque rod and a suspension arm, a universal bush with a socket and a shaft which extends through both sides of the socket is used. A bush which is available for such a use is disclosed in the journal ATZ 84(1982) 7/8, page 355. The bush includes a ball-integral shaft with a ball portion and shaft portions integrally provided on both sides of the ball portion and has a spherical sliding surface between the ball portion of the ball-integral shaft and a bearing body housed in a socket.

Such a bush has a small sliding surface for bearing a load, because the spaces occupied by the shaft portions of the ball-integral shafts are not available as a space for providing a load bearing surface. Therefore, to increase load bearing abilities of the bush, hard thermo-plastic resins having high load bearing characteristics, such as polyacetals, have been used for the material of the bearing body. However, bearing bodies constructed of polyacetals can scarcely absorb manufacturing tolerances of parts of the bush because of their very limited resiliency. Further, it is difficult to keep the rotational torque of the bush at appropriate levels and to obtain a good driving feeling. More specifically, if the bearing body is interference-fitted into the socket with too large of an interference to make additive effects of manufacturing tolerances small, the rotational torque of the bush will be increased to an unacceptable level. Conversely, if the bearing body is loosely fitted into the socket to make the rotation of the shaft smooth, additive effects of manufacturing tolerances of parts of the bush will be increased to a unacceptable level, resulting in decreased driving feeling and bush durability. Therefore, in bushes using hard resins, such as polyacetals, as the material of the bearing body, it is very difficult to satisfy both characteristics of smooth rotation and high durability, though the bush load bearing characteristics are increased.

Apart from a bush with shafts on both sides, a ball and socket joint including a ball-pin with a single shank on one side of a spherical head is disclosed in Japanese Utility Model Publication No. SHO 55-179222 and Japanese Utility Model Publication No. SHO 58-172137. In these two ball and socket joints, the bearing body is divided into two members which are separated from each other. One member is pushed against the spherical head of the ball-pin by a resilient means, such as a metallic coil spring, a rubber means or a resilient rib means, so that the pre-load imposed on the bearing bodies can be adjusted. The resilient means is interposed between the spherical head of the ball-pin and the bottom wall of the socket. Such an arrangement can be adopted in this ball and socket joint because the space on the side of the spherical head where the shank does not extend can be used as a space to provide the resilient means. In the pre-loading mechanism, the rotational torque of the bush is adjusted substantially only by deformation of the resilient means, because deformation of the bearing body itself is not used for the adjustment of the rotational torque of the bush.

When attempting to apply the pre-load adjusting mechanisms disclosed in a ball and socket joint which has a shaft on only one side of the joint to the bush having shaft portions on both sides of the bush, there are a lot of difficulties as mentioned below.

a. A bush differs to a great extent from a ball and socket joint in structure. In a bush, the space occupied by the shaft portions can not be used as a space for providing a resilient means for giving a pre-load to the bearing body, while in a ball and socket joint a comparatively large space on the side where the shank does not extend can be used as a space for providing the resilient means. In a ball and socket joint, a large-sized resilient means which inevitably becomes of a large size to obtain sufficient axial force can be housed in the socket using the above-mentioned large space, but there is no such a large space in a bush. Therefore, a resilient means as disclosed in the above-mentioned Japanese Utility Model Publications, which are constructed of a metallic coil spring and a rubber means can not be used in a bush.

b. Torque adjustment of a bush with a single bearing body is performed via the deformation of the bearing body itself and therefore the torque of the sliding surface of the bush is greatly affected by the deformation of the bearing body, while in a ball and socket joint the torque of the sliding surface is adjusted only by the deformation of the resilient means, without a substantial deformation of the bearing body. Due to the difference in the torque adjustment mechanism, the same torque adjustment mechanism as that of a ball and socket joint can not be applied to a bush.

Due to the above-mentioned reasons, conventional bushes have been used without a special preload-adjustment means resulting in the above-mentioned problems.

SUMMARY OF THE INVENTION

An object of the present invention is, in a bush with a sliding spherical surface including a ball-integral shaft with a ball portion and shaft portions integrally connected to both sides of the ball portion, to attain good absorption of manufacturing tolerances, smooth rotational torque which can easily be adjusted to a desired level, good load bearing characteristics especially in high load conditions including load conditions over normal operating conditions, and excellent durability.

The above-mentioned objects can be attained by using a bush with a spherical sliding surface according to the present invention. The bush comprises: a socket constructed of a hollow, generally cylindrical body having apertures at both ends and having an inside surface which is spherically shaped from an axial mid-portion toward one end and cylindrically shaped from the axial mid-portion toward the other end; a ball-integral shaft having a ball portion having two axial ends and shaft portions integrally connected to both axial ends of the ball portion, the ball portion being located in the socket and the shaft portions extending through the apertures of the socket; a bearing body disposed in the socket and slidably housing the ball portion of the ball-integral shaft therein, the bearing body being constructed of a hollow, generally cylindrical, single body having an outside surface matching the shape of the inside surface of the socket and a spherical inside surface matching the shape of the outside surface of the ball portion of the ball-integral shaft, a contact surface between the bearing body and the ball-portion of the ball-integral shaft continuing between both axial ends of the ball portion of the ball-integral shaft and forming the spherical sliding surface of the bush, the bearing body having a plurality of slits extending in an axial direction from one end of said bearing body to a said mid-portion of the bearing body, the bearing body being constructed of polyacetals; a cushion for pre-loading the bearing body, said cushion being ring-shaped and located in at least one end portion of the socket with an axial end of the cushion being in contact with an axial end of the bearing body, the cushion being constructed of a polymeric elastic material softer than the polyacetals of the bearing body, the cushion including axially receding recesses in at least one axial end portion of the cushion such that said at least one axial end portion includes said axially receding recesses and axially extending ribs spaced between said recesses, and said cushion being assembled in the socket with said axially extending ribs of said cushion being compressed; and a plug for closing a periphery of one of the apertures of the socket, the plug being fixed to a mouth of the socket adjacent to the aperture and being contacted with one axial end of the cushion so as to pre-load the bearing body via the cushion.

In the above-mentioned bush, the ring-shaped cushion is disposed in a small space surrounded by the surface of the axially end portion of the bearing body, the inside surface of the socket and the surface of the plug, and therefore, the sectional area of the cushion would generally be smaller than that of the resilient means used in the previously-mentioned ball and socket joint and the diameter of the cushion would be larger than that of the resilient means of the ball and socket joint, which will make the axial spring constant of the cushion rather soft. However, since the cushion is constructed of a polymeric elastic material, such as polyurethane resins or polyester resins, a satisfactorily high axial force, sufficient to load a necessary axial load on the bearing body, can be obtained. If the cushion had no recesses, the quantity of an axial elastic deformation thereof would be very small and it would become difficult to adjust the torque of the bush by setting the axial force of the cushion at an appropriate level and also it would be difficult to absorb manufacturing tolerances of parts. However, since the cushion of the present invention is provided with recesses, an appropriate axial force can be obtained and the setting of the axial force is easy.

In addition, when the bearing body receives an axial force from the cushion and is pushed against the spherical surface portion of the socket, the bearing body receives a reaction force from the socket and is pushed against the ball portion of the ball-integral shaft in the radial direction of the ball portion. Since the cushion has slits and it can be bent to deform in the radial direction of the ball portion, it is pushed in the radial direction of the ball portion against the ball portion and contacts the surface of the ball portion at the entire inside surface of the bearing body to grasp the ball portion from all surrounding directions. This radial pushing and entire surface grasping owing to the deformation of the bearing body itself, which could not be obtained by the before-mentioned ball and socket joint having divided bearing bodies, increases the grasping ability of the bearing body and makes it easier to adjust the rotational torque of the bush.

BRIEF DESCRIPTION OF THE DRAWINGS

These and other objects of the present invention will become more apparent and more readily appreciated from the following detailed description of the presently preferred exemplary embodiments of the invention taken in conjunction with the accompanying drawings, of which.

DETAILED DESCRIPTION OF THE PREFERRED EMBODIMENTS

Figure 1:
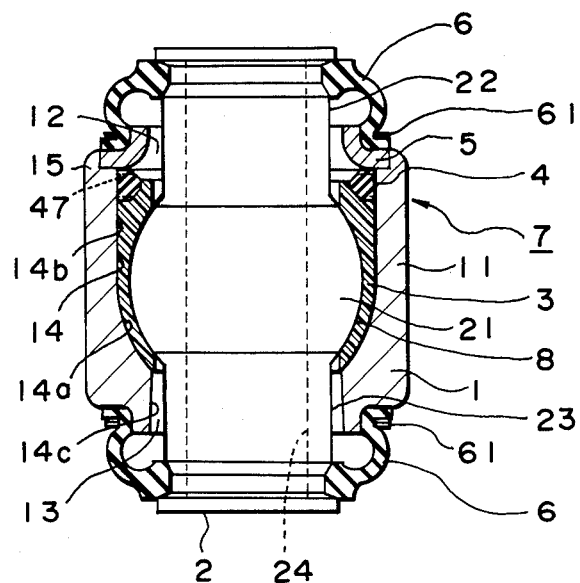
FIG. 1 is a sectional view of a bush with a spherical sliding surface according to a first embodiment of the present invention.

FIG. 1 shows a bush of a first embodiment according to the present invention. In FIG. 1, a bush 7 with a sliding surface 8 includes a socket 1, a ball-integral shaft 2, a bearing body 3, a cushion 4 and a plug 5. Bush 7 further includes a dust seal 6.

Socket 1 is constructed of a hollow, generally cylindrical body 11 having an axial mid-portion, axial ends and apertures 12 and 13 at both axial ends. An inside surface 14 of socket 1 is spherically shaped from the axial mid-portion toward a first axial end to form a spherical portion 14a and is connected to a tapered surface portion 14c which extends from the end of spherical portion 14a to the end of socket 14. Inside surface 14 of socket 1 is cylindrically shaped from the axial mid-portion toward the second axial end to form a cylindrical portion 14b. A step is formed at a shoulder of cylindrical portion 14b. Socket 1 is constructed of metal.

Ball-integral shaft 2 has a ball portion 21 and shaft portions 22 and 23 which are coaxial to each other and are integrally connected to both sides of ball portion 21. Ball portion 21 is located in socket 1 and shaft portions 22 and 23 extend through apertures 12 and 13 of socket 1, respectively. Ball-integral shaft 2 has a hole 24 which axially extends over the entire length of ball-integral shaft 2 and hole 24 receives a shaft to be fitted to ball-integral shaft 2 (not shown). Ball-integral shaft 2 is constructed of metal.

Figure 2:
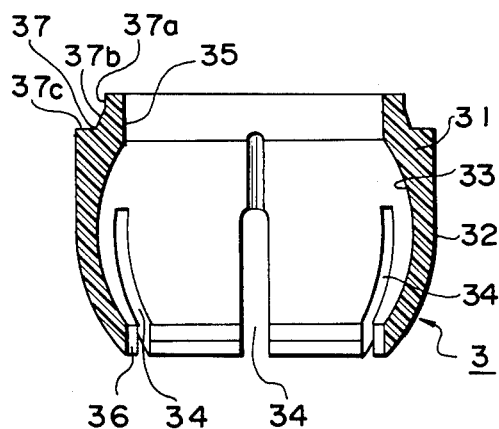
FIG. 2 is a sectional view of a bearing body of the bush of FIG. 1.
Figure 3:
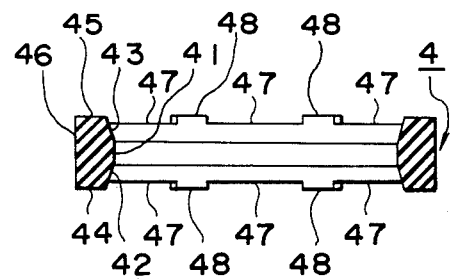
FIG. 3 is a sectional view of a cushion of the bush of FIG. 1.

Bearing body 3 is disposed in socket 1 and slidably houses ball portion 21 of ball-integral shaft 2 therein. As shown more detailedly in FIG. 2, bearing body 3 is constructed of a hollow, generally cylindrical, single body 31 which has an outside surface 32 matching the shape of inside surface 14 of socket 1. The contact of bearing body 3 with the inside surface of spherical portion 14a of socket 1 produces radial forces which push bearing body 3 toward ball portion 21. Bearing body 3 has a spherical inside surface 33 matching the shape of the outside surface of ball portion 21 of ball-integral shaft 2. A contact surface between bearing body 3 and ball portion 21 of ball-integral shaft 2 forms the spherical sliding surface 8 of bush 7. Bearing body 3 has a plurality of slits 34 which extend axially from one end of bearing body 3 to an axially mid-portion of bearing body 3. Slits 34 make it possible to place ball portion 21 into bearing body 3 by enlarging the diameter of the slit portion of bearing body 3. Slits 34 also make the slit portion of bearing body 3 deform in the radial direction of ball portion 21. Bearing body 3 has apertures 35 and 36 at both axial ends thereof. Bearing body 3 has a step 37 in a shoulder thereof to allow cushion 4 to be seated thereon. Step 37 has a shape to match an inside surface and one axially end surface of cushion 4 to restrict a radially inward deformation of cushion 4. Step 37 has a cylindrical surface 37a, a conical surface 37b connected to cylindrical surface 37a and a flat plane surface 37c connected to conical surface 37b. Bearing body 3 is constructed of polyacetals which are hard resins preferable for use as a material of a bearing and have high load bearing characteristics.

Cushion 4 is a member for giving a pre-load to bearing body 3 and is constructed of a polymeric elastic material selected from polyurethane resins and polyester resins having a Shore hardness 45–75, respectively. The material is softer than polyacetals of bearing body 3. Cushion 4 is shaped in the form of a ring and is located in one end portion of socket 1 and in step 37 of bearing body 3 with the axial end of cushion 4 being contacted with the axial end of bearing body 3. Cushion 4 is covered and compressed by plug 5 when cushion 4 is assembled in socket 1. Cushion 4 is generally symmetrical in the axial direction with respect to the axial center of cushion 4. Cushion 4 has a cylindrical inside surface 41, conical surfaces 42 and 43 connected to both ends of inside surface 41, flat plane surfaces 44 and 45 connected to ends of conical surfaces 42 and 43, respectively, and a cylindrical outside surface 46. Surfaces 41, 42 and 44 of cushion 4 contact surfaces 37a, 37b and 37c of step 37 formed in the shoulder of bearing body 3, respectively. When cushion 4 is compressed, conical surface 42 of cushion 4 pushes conical surface 37b of step 37 formed in bearing body 3 in the radial direction of ball portion 21 and contributes to the deformation of the non-slit portion of bearing body 3 radially toward ball portion 21.

Figures 5, 6:
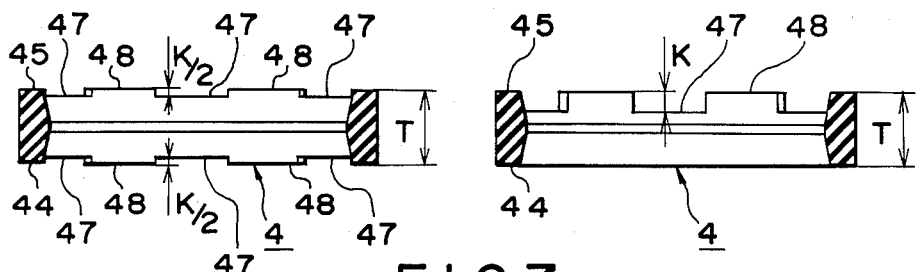
FIG. 5 is a sectional view of the cushion with dimensions of FIG. 3.
FIG. 6 is a sectional view of another cushion with dimensions which can be used in the present invention.
Figure 7:
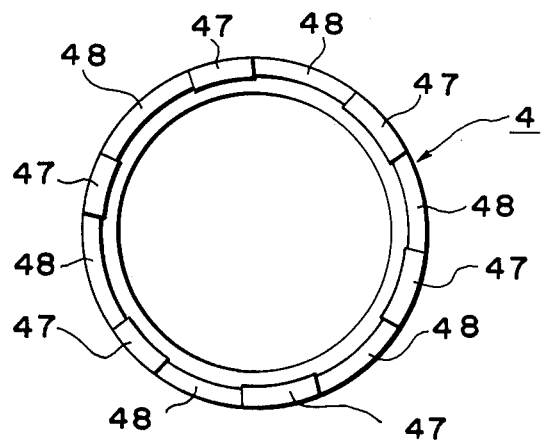
FIG. 7 is a plane view of the cushion of FIG. 5 or FIG. 6.

As shown in FIG. 5, cushion 4 has a plurality of recesses 47 in both axial end portions of cushion 4. Recesses 47 recede axially from the plane surfaces 44 and 45. Recesses 47 extend radially from conical surfaces 42 and 43 to outside surface 46 of cushion 4. By forming recesses 47, the remained portions between recesses 47 form ribs 48 protruding axially from the bottom surfaces of recesses 47 to the plane surfaces 44 and 45. When cushion 4 is assembled in socket 1 and covered by plug 5, cushion 4 is compressed axially between plug 5 and bearing body 3 and the compression deformation of cushion 4 occurs especially in ribs 48, because ribs 48 can deform into recesses 47 in the circumferential direction of cushion 4. The deformation of cushion 4 in the radial direction is restricted by surfaces 37a and 37b of step 37 formed in bearing body 3 and the inside surface of cylindrical portion 14b of socket 1.

Recesses 47 may be formed in only one axial end portion of cushion 4 as shown in FIG. 6. In such a case, recesses 47 may be formed on side of plane surface 44 or on side of plane surface 45, but recesses 47 of FIG. 6 must have a depth K twice as deep as the depth K/2 of recesses 47 of the case of FIG. 5.

Figure 4:
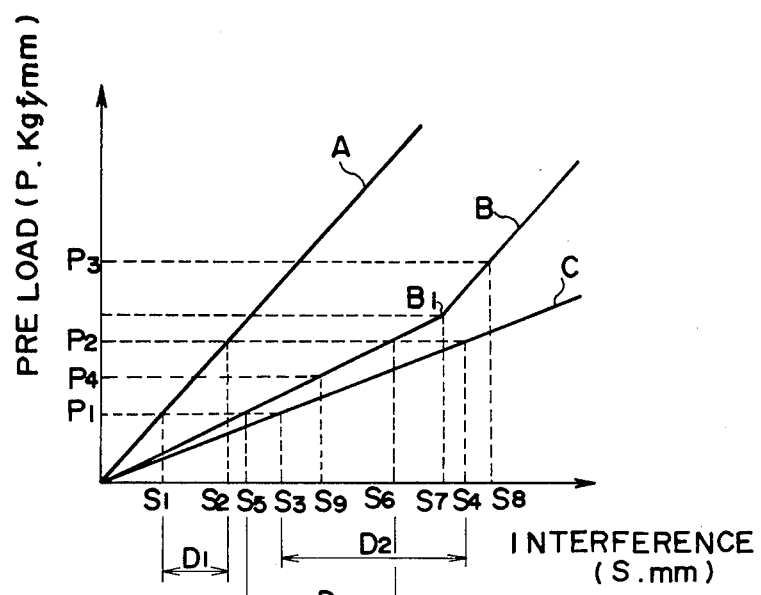
FIG. 4 is a diagram showing the relationship between a compression deformation of the cushion and a generated pre-load.

FIG. 4 shows the relationship between an axial elastic deformation of cushion 4, which corresponds to an interference between cushion 4 and plug 5, and pre-loads imposed on bearing body 3. In FIG. 4, a line B corresponds to cushion 4 of the present invention. A line A corresponds to a cushion constructed of the same material as that of the present invention but having no recesses and no ribs, and a line C corresponds to a cushion constructed of a material softer than the material used in the present invention, such as rubber, and having no recesses and no ribs. In FIG. 4, the pre-loads which are required for the bush to act satisfactorily in normal operating conditions are shown defined by an upper limit pre-load $P_2$ and a lower limit pre-load $P_1$. When the conditions of $P_1$ and $P_2$ are fixed, in the case of line A, design interferences of a cushion are in the range between $S_1$ and $S_2$. As will be easily understood from FIG. 4, the interference range $D_1$ between $S_1$ and $S_2$ becomes so small that absorption of manufacturing tolerances is difficult and setting the rotational torque of the bush in such a small range is difficult. This means that a mere insertion of a cushion having no recesses and no ribs does little to aid in the absorption of manufacturing tolerances and to stabilization of the rotational torque. Next, in the case of line C, design interferences of a cushion are in the range of $S_3$ and $S_4$ and the interference range $D_2$ between $S_3$ and $S_4$ is too large. Since a cushion of rubber can not produce a large pre-load such as $P_2$, load bearing characteristics in high load range of a bush will be hampered as will be effective absorption of manufacturing tolerances. Accordingly, the durability of a bush will be decreased.

In cushion 4 of line B, that is, in cushion 4 of the present invention, design interferences are in the range of $S_5$ and $S_6$ and the interference range $D_3$ is widened to a sufficient extent compared with $D_1$, because the inclination angle of line B is smaller than that of line A owing to recesses 47 and ribs 48. In the present invention, the initial interference of cushion 4 is set at a center $S_9$ of $D_3$ which corresponds to a pre-load $P_4$ and interferences will be varied between $S_5$ and $S_6$ under normal operating conditions according to live loads of the bush. As a result, in bush 7 of the present invention manufacturing tolerances of parts of the bush will be effectively absorbed and, in addition, it is easy to adjust and place the rotational torque of bush 7 in such a wide range.

In case large loads exceeding the normal operating loads act on bush 7, the preload P to be imposed on bush 7 should be large, because additive effects of manufacturing tolerances will be suppressed and the durability of bush 7 will be increased. When excessively large loads act on bush 7 of the present invention and interference quantity S comes to a point $S_7$ which is larger than $S_6$, the inclination angle of line B is increased in the region beyond a point $B_1$ where bush 7 shows nearly the same hard characteristics as those of line A. For example, when the interference becomes $S_8$ which is far larger than $S_7$, a very large pre-load $P_3$ is imposed on bush 7 and generation of clearances between the parts of bush 7 will be suppressed and bush 7 of the present invention can bear the high loads.

According to tests, the following material and dimensional requirements were proved necessary to produce preferable pre-loads on bush 7. With respect to the material of cushion 4, polyurethane resins or polyester resins of Shore hardness 45–75 are desirable. Especially, in the case of polyurethane resins, polyurethanes having a Shore hardness of about 60 (100% modulus, 200 kgf/cm) are most desirable. Further, the total depth K of recesses 47 is preferably in the range of 10–35% of the entire height T of cushion 4. Furthermore, the total of the widths D of recesses is preferably in the range of 50–75% of the circumferential length of cushion 4.

For example, the tests showed that in the case of a cushion constructed of polyurethanes of Shore hardness 60 and having an outside diameter of 28.5 mm, an inside diameter of 24 mm and a height of 4.4 mm, but having no recesses, a pre-load of 370 kgf/mm was obtained, while when six recesses each of which had a width of 9 mm and a depth (K/2) of 0.5 mm were provided in both axial end portions, a pre-load of 160 kgf/mm was obtained in the range between 0 and point $B_1$ and a preload of 400 kgf/mm was obtained in the range beyond point $B_1$.

After insertion of cushion 4 into socket 1, plug 5 is fixed to a mouth 15 of socket 1 adjacent aperture 12 by coking mouth 15. Plug 15 closes a periphery of aperture 12. Plug 15 contacts with one axial end of cushion 4 so as to give a pre-load to bearing body 3 via cushion 4 after coking of mouth 15.

Dust seals 6 are assembled between socket 1 and shaft portions 22 and 23 to prevent dust from going into bush 7. One end of each dust seal 6 is fixed to socket 1 by a split ring 61 which has a split portion on its circle so that it can be enlarged in diameter when it is assembled to socket 1. The other end of each dust seal 6 is fixed to one of circumferentially extending grooves formed in shaft portions 22 and 23.

Figure 8:
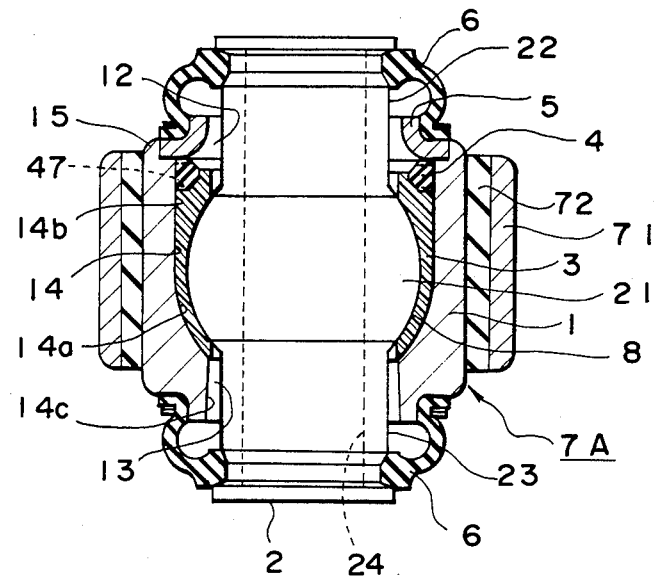
FIG. 8 is a sectional view of a bush with a spherical sliding surface according to a second embodiment of the present invention.

FIG. 8 shows a bush 7A according to a second embodiment of the present invention. Bush 7A has the same structure as that of bush 7 of the first embodiment and further comprises an outside cylinder 71 and a rubber member 72. The portions having the same structure are given with the same reference numerals as those of the first embodiment. Outside cylinder 71 has an inner diameter larger than the outside diameter of socket 1 and is disposed radially outside of socket 1. Rubber member 72 is disposed between the inside surface of outside cylinder 71 and the outside surface of socket 1 and is bonded to the inside surface of outside cylinder 71 and the outside surface of socket 1.

In the first and second embodiments, a pre-load is imposed to bearing body 3 via cushion 4. Since cushion 4 is constructed of polyurethane resins or polyester resins having a Shore hardness 45–75, a pre-load generated by a cushion having no recesses becomes too large to be used in a bush. However, since cushion 4 has recesses 47 with the above-mentioned dimensions, the pre-load generated by cushion 4 is weakened to an appropriate level and maintains an appropriate rigidity over an enough wide range of $D_3$. Such a pre-load can not be obtained with a cushion constructed of rubber or a cushion having no recesses constructed of polyurethane resins. Owing to the deformation of cushion 4 over the enough large range and the specified pre-load, manufacturing tolerances between parts will be effectively absorbed, and in addition, the adjustment of rotational torque of bush 7 will become easy. When bush 7 receives too large loads from the suspension mechanism of an automobile and cushion 4 intends to deform to a great extent, the deformation of cushion 4 goes into the region beyond point $B_1$ on line B in FIG. 4, and cushion 4 acts as if it had no recesses and cushion 4 becomes sufficiently hard. As a result, the characteristics in high load regions becomes stabilized, and in addition, the durability of bush 7 is improved.

In addition, since bearing body 3 is not divided into two members but is constructed of a single body in the first and second embodiments of the present invention, and since the outside surface of bearing body 3 contacts the spherical inside surface of spherical portion 14$b$ of socket 1, the axial force imposed on bearing body 3 from cushion 4 is converted to radial forces toward ball portion 21 of ball-integral shaft 2 and intends to grasp ball portion 21 at its entire spherical inside surface, because bearing body 3 can deform in the circumferential direction due to slits 34. This radial compression makes the adjustment of rotational torque easy and reliable, even though the axial force due to the deformation of ribs 48 is not large compared with a cushion having no recesses.

Figure 9:
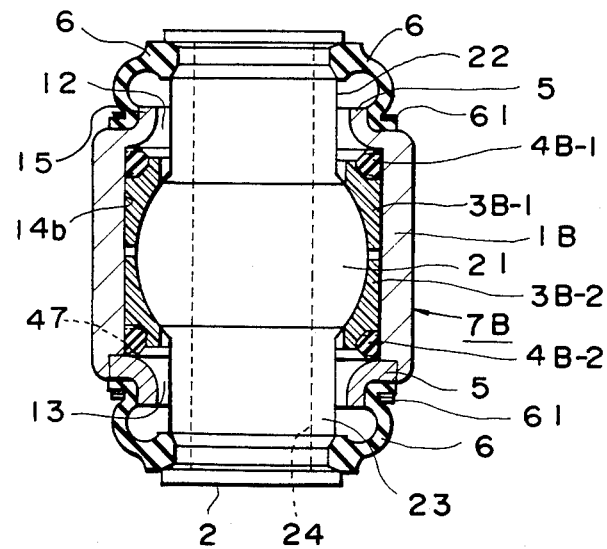
FIG. 9 is a sectional view of a bush with a spherical sliding surface according to a third embodiment of the present invention.

FIG. 9 shows a third embodiment of the present invention. A bush 7B of the third embodiment has two bearing bodies 3B-1 and 3B-2 and two cushions 4B-1 and 4B-2. Socket 1B has only a cylindrical inside surface and does not have a spherical inside surface. Other structures of the third embodiment are the same as those of the first embodiment and the portions having the same structure are given with the same reference numerals as those of the first embodiment.

In the third embodiment, ball porion 21 of ball-integral shaft 2 is axially squeezed by the two bearing bodies 3B-1 and 3B-2 from both sides. Ball-integral shaft 2 does not receive the radial force due to the spherical portions of socket 1 but receives the radial force due to the conical surfaces of cushions 4B-1 and 4B-2. Pre-loading by cushions 4B-1 and 4B-2 having recesses 47 is also used in the third embodiment.

Although only a few exemplary embodiments of the present invention have been described in detail above, those skilled in the art will readily appreciate that many modifications are possible in the exemplary embodiments without materially departing from the novel teachings and advantages of the invention. Accordingly, all such modifications are intended to be included within the scope of the present invention as defined in the following claims.

What is claimed is:

1. A bush with a spherical sliding surface comprising:
   a socket constructed of a hollow, generally cylindrical body having an axial mid-portion, first and second axial ends, and apertures at each axial end and having an inside surface which is spherically shaped from said axial mid-portion toward said first axial end and cylindrically shaped from said axial mid-portion toward said second axial end;
   a ball-integral shaft having a ball portion having opposed axial ends and a shaft portions integrally connected to said opposed axial ends of the ball portion, said ball portion being located in said socket and said shaft portions extending through said apertures of said socket along a longitudinal axis;
   a bearing body having a first and second axial ends disposed in the socket, said first and second axial ends corresponding to said first and second axial ends of said socket, said bearing body slidably housing said ball portion of said ball-integral shaft therein, said bearing body comprising a hollow, generally cylindrical, single body having an outside surface matching the shape of said inside surface of said socket and a spherical inside surface matching the shape of an outside surface of said ball portion of said ball-integral shaft, a contact surface between said bearing body and said ball-portion of said ball-integral shaft extending between said opposed axial ends of said ball portion of said ball-integral shaft and forming said spherical sliding surface of the bush, said bearing body including a step formed in a shoulder portion proximate said first axial end, said step comprising a first surface which is substantially perpendicular to said longitudinal axis and a second surface which is oblique to said longitudinal axis said bearing body having a plurality of slits extending in an axial direction from said second axial end to a mid-portion of said bearing body, said bearing body being constructed of polyacetals;

a cushion for pre-loading said bearing body, said cushion being ring-shaped and having axial end portions, said cushion being located in at least one of said first and second end portions of said socket with an axial end of said cushion seated in said step of said bearing body, said cushion being constructed of a polymeric elastic material which is softer than the polyacetals of said bearing body, said cushion including axially receding recesses in at least one of said axial end portions of said cushion such that said at least one axial end portion includes said axially receding recesses and axially extending ribs spaced between said recesses, and said cushion being assembled in said socket with said axially extending ribs being compressed so as to provide a preload force on said first and second surfaces of said step; and a plug for closing a periphery of one of said apertures of said socket, the plug fixed to a mouth of said socket adjacent to the aperture, and being in contact with one axial end of said cushion so as to pre-load said bearing body via said cushion.

2. The bush according to claim 1, wherein said cushion is constructed of a material selected from polyurethane resin and polyester resins having a Shore hardness of 45–75.

3. The bush according to claim 1, wherein said bearing body has a stepped shoulder portion and the cushion is housed in a space surrounded by the stepped shoulder portion, the socket and the plug.

4. The bush according to claim 1, wherein said cushion has an axial center, and a portion of the cushion which includes said axially extending ribs is symmetric in the axial direction with respect to an axial center of the cushion.

5. The bush according to claim 1, wherein the bearing body has a stepped shoulder portion having a surface which comprises a cylindrical surface, a conical surface connected to an end of the cylindrical surface and a flat plane surface connected to the conical surface, and the cushion has a cylindrical inside surface having two ends, conical surfaces connected to said ends of the cylindrical inside surface and plane surfaces connected to the conical surfaces, the cylindrical inside surface of the cushion being in contact with the cylindrical surface of the stepped shoulder portion, one of the conical surfaces of the cushion and one of the plane surfaces of the cushion being in the stepped shoulder portion, respectively.

6. The bush according to claim 1, wherein the cushion includes axially receding recesses at both axial end portions thereof.

7. The bush according to claim 1, wherein the cushion includes axially receding recesses at only one axial end portion thereof.

8. The bush according to claim 1, wherein a total depth K of axially receding recesses formed in the cushion is in the range of 10–35% of the entire height of the cushion and a total of the widths of the recesses is in the range of 50–75% of the circumferential length of the cushion.

9. The bush according to claim 1, the bush further comprising:
dust seals provided at both apertures of the socket, said dust seals extending between said shaft portions of the ball-integral shaft and said socket.

10. The bush according to claim 1, the bush further comprising:
an outside cylinder disposed radially outside of said socket, said outside cylinder having an inner diameter which is larger than an outside diameter of the socket; and
a rubber member disposed between an inside surface of said outside cylinder and an outside surface of said socket, wherein said rubber member is fixed to both the inside surface of the outside cylinder and the outside surface of the socket.

11. A bush with a spherical sliding surface comprising:
a socket constructed of a hollow, generally cylindrical body having an axial mid-portion, first and second axial ends, and apertures at each axial end and having an inside surface which is cylindrically shaped from said axial mid-portion toward said first and second axial ends;
a ball-integral shaft having a ball portion having opposed axial ends and shaft portions integrally connected to said opposed axial ends of the ball portion, the ball portion being located in said socket and said shaft portions extending through said apertures of said socket;
a pair of bearing bodies having axial ends disposed in the socket and slidably housing said ball portion of said ball-integral shaft therein, each of the bearing bodies comprising a hollow, generally cylindrical, body having an outside surface matching the shape of said inside surface of said socket and a spherical inside surface matching the shape of an outside surface of the ball portion of said ball-integral shaft, contact surfaces between said bearing bodies and the ball-portion, of said ball-integral shaft forming said spherical sliding surface of the bush, said bearing bodies being constructed of polyacetls;
a pair of cushions for pre-loading said bearing bodies, said cushions being ring-shaped and having axial end portions, said cushions being located in said axial end portions of the socket with said axial end of said cushions being in contact with said axial ends of the bearing bodies, said cushions being constructed of a polymeric elastic material which is softer than the polyacetals of the bearing bodies, each of said cushions including axially receding recesses in at least one of said axial end portions of the cushion such that said at least one axial end portion includes said axially receding recesses and axially extending ribs spaced between said recesses, and said cushions being assembled in the socket with said axially extending ribs being compressed, wherein said recesses and said ribs are dimensioned such that upon application of a predetermined axial force said ribs deform such that said at least one axial end portion of said cushion becomes substantially flat thereby decreasing the resiliency of said cushion; and a plug for closing a periphery of one of said apertures of said socket, the plug being fixed to a mouth of said socket adjacent to the aperture, and being in contact with one axial end of one of said cushions so as to pre-load the bearing bodies via the cushions.

* * * * *